United States Patent
Wang

(10) Patent No.: US 12,544,706 B2
(45) Date of Patent: Feb. 10, 2026

(54) FLOW GUIDING DEVICE FOR CARBON CAPTURE SYSTEM

(71) Applicant: NATIONAL CHENG KUNG UNIVERSITY, Tainan (TW)

(72) Inventor: Wei-Cheng Wang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 362 days.

(21) Appl. No.: 18/499,740

(22) Filed: Nov. 1, 2023

(65) Prior Publication Data

US 2025/0025823 A1 Jan. 23, 2025

(30) Foreign Application Priority Data

Jul. 20, 2023 (TW) ................................. 112127194

(51) Int. Cl.
*B01D 53/22* (2006.01)
*B01D 53/04* (2006.01)

(52) U.S. Cl.
CPC .... *B01D 53/0446* (2013.01); *B01D 2257/504* (2013.01)

(58) Field of Classification Search
CPC ................ B01D 53/0446; B01D 2257/504
See application file for complete search history.

(56) References Cited

U.S. PATENT DOCUMENTS

| | | | | |
|---|---|---|---|---|
| 3,716,969 A | * | 2/1973 | Maeda | B01D 53/508 95/110 |
| 5,330,726 A | * | 7/1994 | Bruggendick | B01J 8/12 34/174 |
| 6,487,854 B2 | * | 12/2002 | Maus | F01N 3/2892 60/323 |
| 2009/0285730 A1 | * | 11/2009 | Naunheimer | B01D 53/0431 422/211 |
| 2009/0311143 A1 | * | 12/2009 | Lee | C01B 3/323 422/220 |
| 2011/0277640 A1 | * | 11/2011 | Hsiau | B01D 46/38 96/399 |
| 2012/0014840 A1 | * | 1/2012 | Hanai | H01T 23/00 422/120 |
| 2014/0271420 A1 | * | 9/2014 | Kirchman | B01D 53/18 422/187 |

(Continued)

Primary Examiner — Anthony Shumate
(74) Attorney, Agent, or Firm — MUNCY, GEISSLER, OLDS & LOWE, P.C.

(57) ABSTRACT

A flow guiding device for a carbon capture system includes a connecting unit and a flow guiding unit connected to the connecting unit. The connecting unit includes a communicating member defining a gas flow channel, a main housing diverging gradually from the communicating member, and a gas rectifier disposed opposite to the communicating member and having a plurality of air holes. The flow guiding unit includes a guiding member defining an flow channel in fluid communication with the gas flow channel and having a plurality of through holes in fluid communication with the flow channel, a main body diverging gradually from the guiding member, and a flow disturbing member disposed at a terminal portion of the main body and having a plurality of flow distributing holes. The main body cooperates with the main housing to define an annular flow channel therebetween that is in fluid communication with the through holes.

13 Claims, 7 Drawing Sheets

(56) References Cited

U.S. PATENT DOCUMENTS

| | | | |
|---|---|---|---|
| 2015/0251126 A1* | 9/2015 | Billiet | F16K 7/075 96/114 |
| 2016/0115848 A1* | 4/2016 | Kurikka | B01F 25/32 422/168 |
| 2016/0194995 A1* | 7/2016 | Weiss | F01N 3/2892 60/324 |
| 2017/0370315 A1* | 12/2017 | Bumberger | F02D 41/1466 |
| 2019/0247778 A1* | 8/2019 | Handte | B01D 46/71 |
| 2020/0398213 A1* | 12/2020 | Behkish | B01J 8/0035 |
| 2022/0099202 A1* | 3/2022 | Sun | F16K 15/02 |
| 2023/0323851 A1* | 10/2023 | Holland | E21B 41/0085 166/244.1 |
| 2024/0147972 A1* | 5/2024 | Van Kilsdonk | A01K 67/30 |
| 2024/0207549 A1* | 6/2024 | Liu | A61M 16/0066 |
| 2024/0226795 A1* | 7/2024 | Russell | B01D 53/0446 |
| 2025/0281868 A1* | 9/2025 | Manson | B01D 53/0446 |

\* cited by examiner

FLOW GUIDING DEVICE FOR CARBON CAPTURE SYSTEM

CROSS-REFERENCE TO RELATED APPLICATION

This application claims priority to Taiwanese Invention Patent Application No. 112127194, filed on Jul. 20, 2023, which is incorporated by reference herein in its entirety.

FIELD

The disclosure relates to a flow guiding device, and more particularly to a flow guiding device for a carbon capture system.

BACKGROUND

Referring to FIGS. 1 and 2, a carbon capture system 9 includes an equipment 91 that outputs an exhaust gas during operation, a flow guiding tube 92 that is in fluid communication with the equipment 91 and that has inlet and outlet ports 921, 922 for passage of the exhaust gas, and a chamber 93 that is disposed downstream of the flow guiding tube 92, that is in fluid communication with the outlet port 922, and that includes an absorbent disposed therein for absorbing chemical components in the exhaust gas.

When the carbon capture system 9 is in operation, the exhaust gas generated by the equipment 91 is introduced into the flow guiding tube 92 through the inlet port 921 of the flow guiding tube 92, and then flows outwardly of the outlet port 922 into the chamber 93. The absorbent is in contact with the exhaust gas introduced into the chamber 93 to absorb chemical components such as carbon monoxide and carbon dioxide in the exhaust gas. Generally, most absorbents available on the market are made of a porous material in a solid form that absorbs chemical components through Van der Waals forces or strong covalent resultant forces when being in contact with the exhaust gas for purifying the exhaust gas.

However, during operation of the carbon capture system 9, the exhaust gas flows out of the flow port 921 as a concentrated stream as depicted in FIG. 2. Consequently, the exhaust gas may not be evenly dispersed and flow uniformly through the absorbent in the chamber 93, so the chemical components may not be absorbed sufficiently.

SUMMARY

Therefore, an object of the disclosure is to provide a flow guiding device that can alleviate at least one of the drawbacks of the prior art.

According to the disclosure, a flow guiding device for a carbon capture system is provided. The carbon capture system includes a delivery module for outputting an exhaust gas that contains carbon dioxide, and a scrubbing module disposed downstream of and in fluid communication with the delivery module and including a scrubber that is for scrubbing carbon dioxide in the exhaust gas. The flow guiding device includes a connecting unit that is adapted to be connected to the delivery module and a flow guiding unit that is disposed in and connected to the connecting unit. The connecting unit includes a communicating member, a main housing, and a gas rectifier. The communicating member is adapted to be connected to the delivery module and defines a gas flow channel that extends along an axis and that is adapted to convey the exhaust gas. The main housing diverges gradually from the communicating member, defines a guiding space that is frustoconical and that surrounds the axis, and is adapted to be opposite to the delivery module along the axis. The gas rectifier is disposed at an end portion of the main housing that is opposite to the communicating member, and has a plurality of air holes adapted for dispersing the exhaust gas passing therethrough to enter the scrubbing module. The flow guiding unit includes a guiding member, a main body, and a flow disturbing member. The guiding member surrounds the axis, and defines a flow channel that is in fluid communication with the gas flow channel and has a plurality of through holes that is in fluid communication with the flow channel. The main body diverges gradually from the guiding member, is opposite to the communicating member, defines a flow guiding space therein that is frustoconical, that surrounds the axis, and that is adapted for passage of the exhaust gas therethrough. The main body cooperates with the main housing to define an annular flow channel therebetween that is in fluid communication with the through holes and that is adapted for passage of a portion of the exhaust gas therethrough. The flow disturbing member is disposed at a terminal portion of the main body that is opposite to the communicating member, and has a plurality of flow distributing holes that are adapted for passage of the exhaust gas therethrough.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
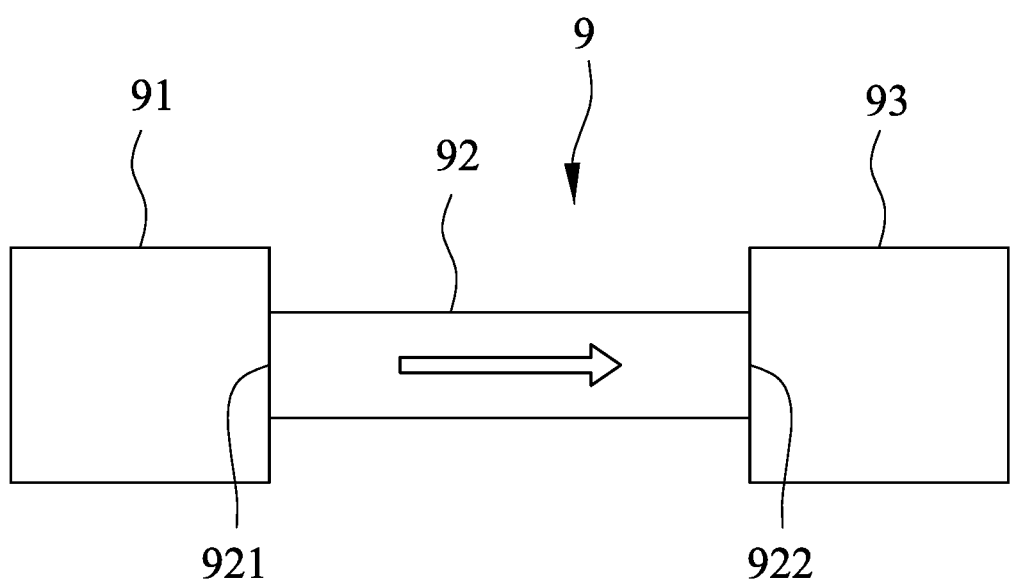
FIG. 1 is a schematic diagram illustrating a carbon capture system.
Figure 2:
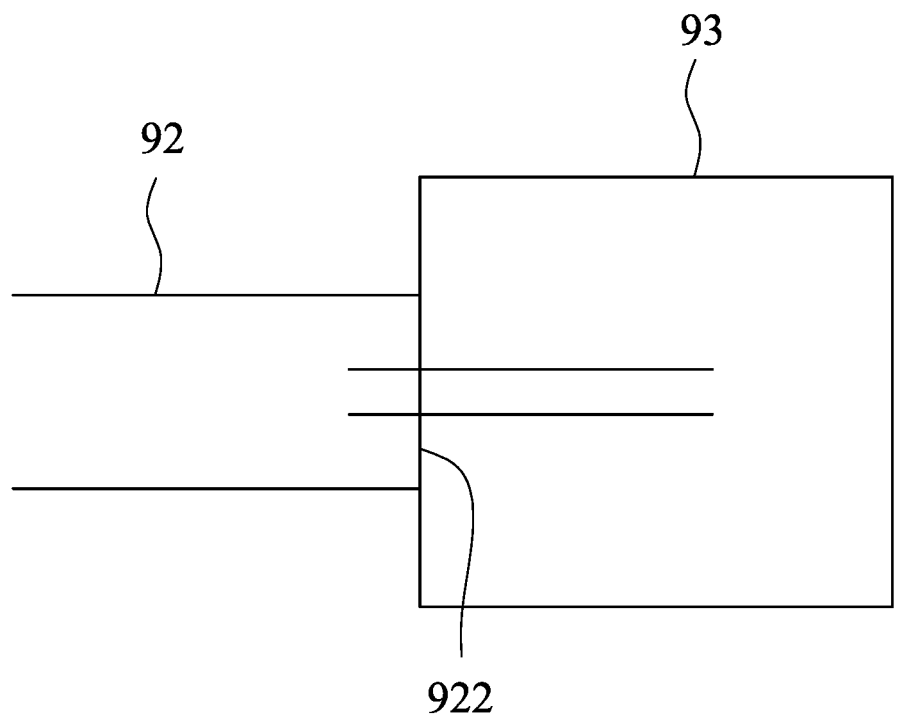
FIG. 2 is a schematic diagram illustrating an exhaust gas flow being conveyed by a flow guiding tube of the carbon capture system as a concentrated stream.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently e.g., rotated 90 degrees or at other orientations and the spatially relative terms used herein may be interpreted accordingly.

Figure 3:
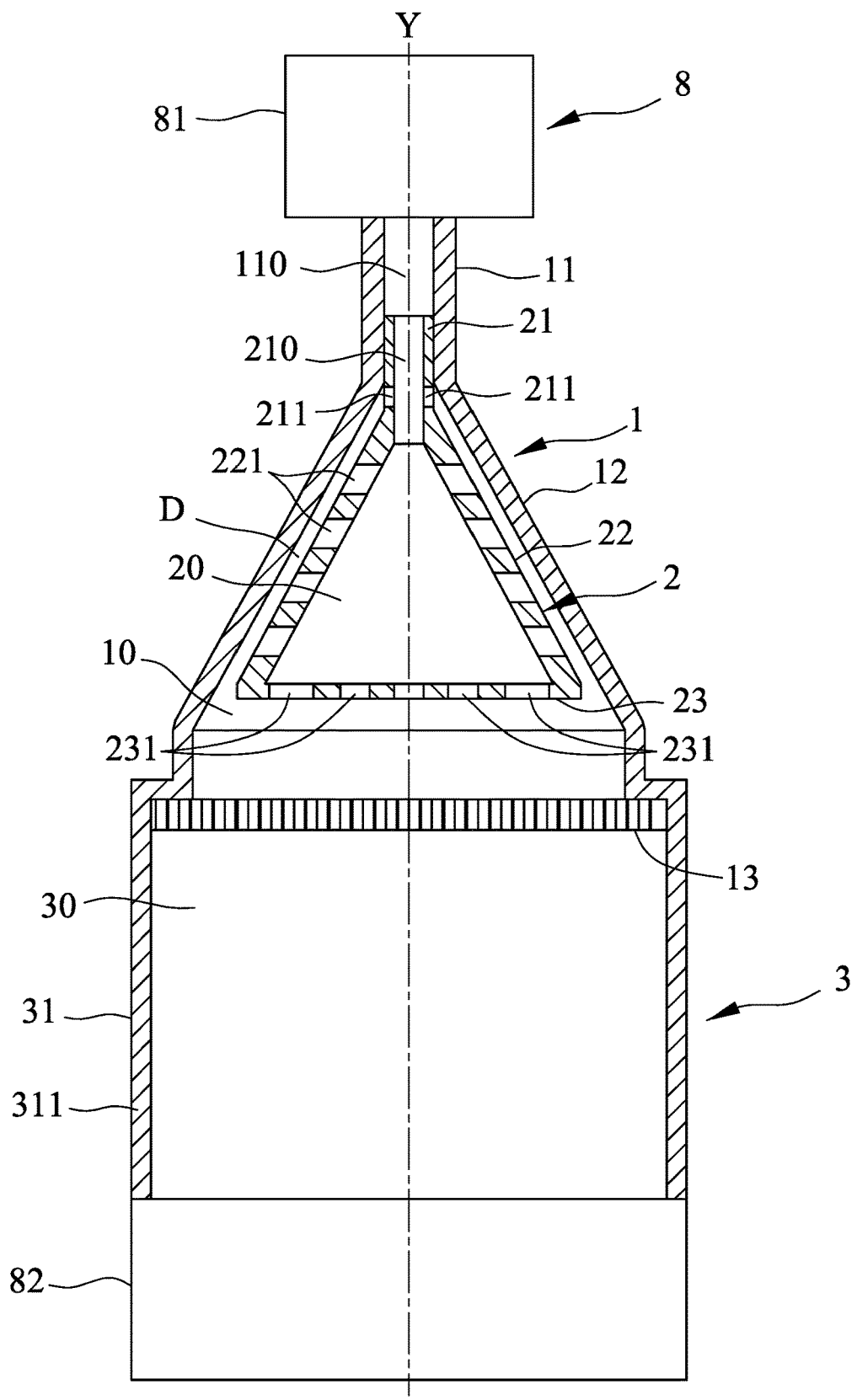
FIG. 3 is a schematic sectional view illustrating a flow guiding device according to an embodiment of the present disclosure connected to a carbon capture system.
Figure 4:
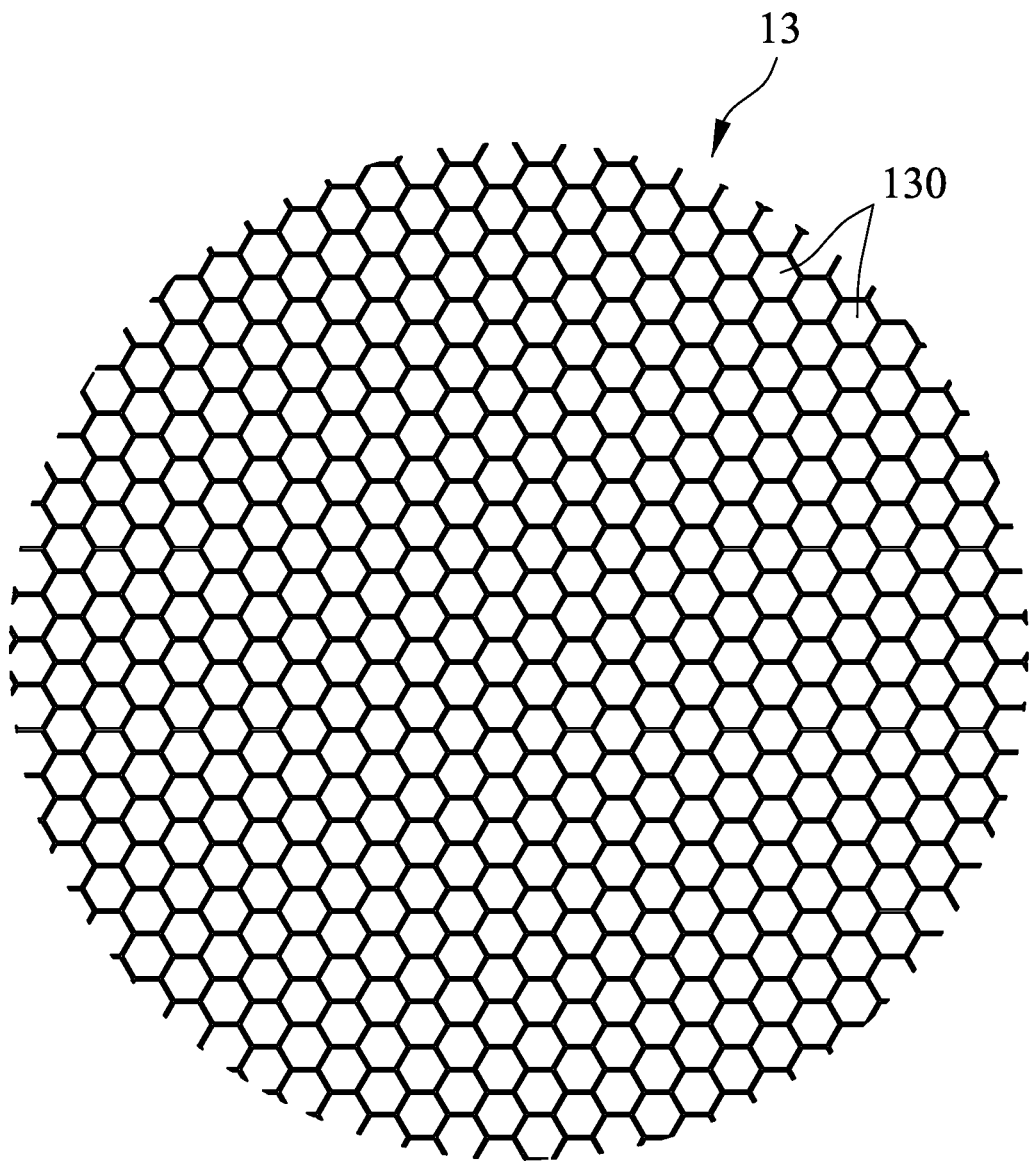
FIG. 4 is a fragmentary sectional view of a gas rectifier of the embodiment.
Figure 5:
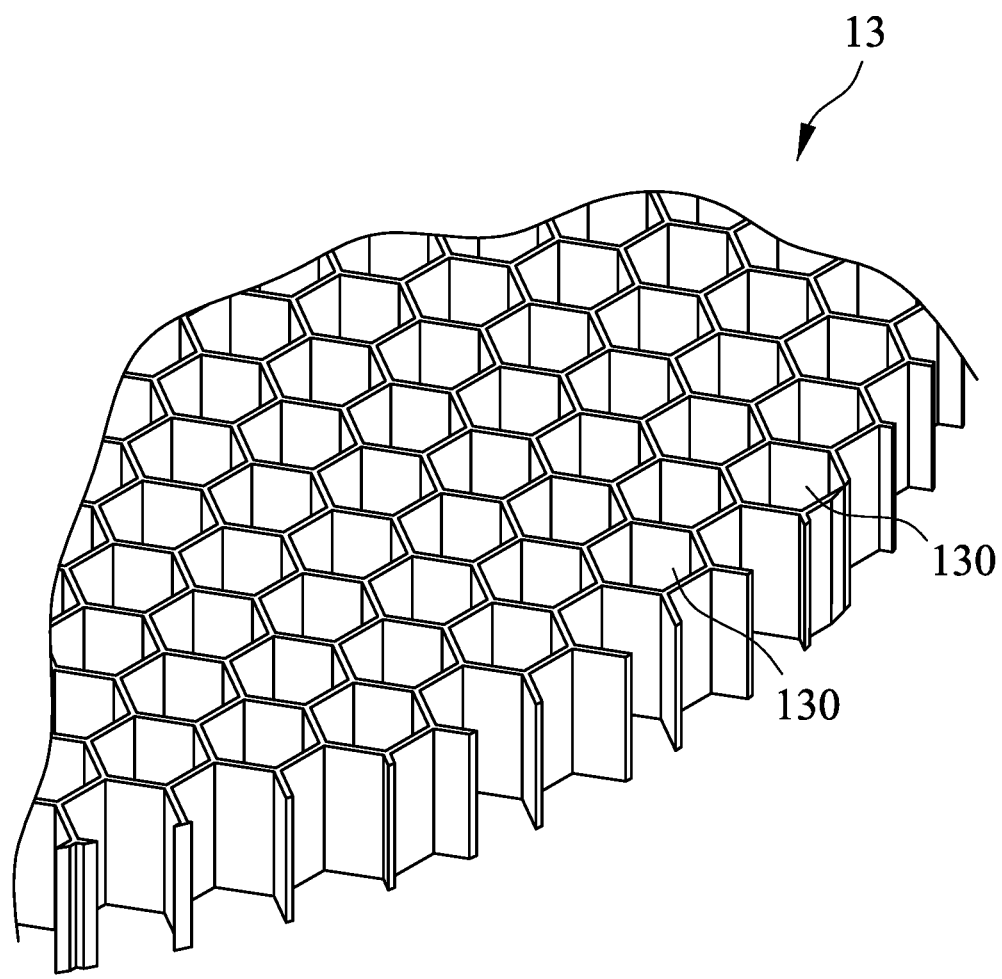
FIG. 5 is a fragmentary perspective view of the gas rectifier.

Referring to FIGS. 3 to 5, a flow guiding device of an embodiment according to the present disclosure is to be used in a carbon capture system 8. The carbon capture system 8 includes a delivery module 81 outputting an exhaust gas that contains carbon, and a scrubbing module 82 disposed downstream of and in fluid communication with the delivery module 81 and including a scrubber that is for scrubbing chemical components in the exhaust gas. Specifically, the exhaust gas contains chemical components such as carbon monoxide, carbon dioxide and other carbon-containing components, and the scrubber of the scrubbing module 82 is for absorbing and scrubbing the chemical components in the exhaust gas. For example, the scrubber of the scrubbing module 82 may be a porous material, but not limited thereto. The flow guiding device is adapted to be disposed between the delivery module 81 and the scrubbing module 82 for guiding the exhaust gas from the delivery module 81 to the scrubbing module 82, and includes a connecting unit 1, a flow guiding unit 2 and a stabilizing unit 3. The connecting unit 1 is adapted to be connected to and disposed downstream of the delivery module 81. The flow guiding unit 2 is disposed in and connected to the connecting unit 1. The stabilizing unit 3 is adapted to be disposed upstream of the scrubbing module 82 and in fluid communication with the connecting unit 1 and the scrubbing module 82.

The connecting unit 1 includes a communicating member 11, a main housing 12, and a gas rectifier 13. The communicating member 11 is adapted to be connected to the delivery module 81 and defines a gas channel 110 that extends along an axis (Y) and that is adapted to convey the exhaust gas. In this embodiment, the communicating member 11 is tubular. The main housing 12 diverges gradually from the communicating member 11, defines a gas guiding space 10 that is frustoconical and that surrounds the axis (Y), and is adapted to be opposite to the delivery module 81 along the axis (Y). Specifically, the main housing 12 is integrally connected to the communicating member 11 in an air tight manner, and is disposed downstream of the communicating member 11. The gas rectifier 13 is disposed downstream of the main housing 12, in particularly disposed at an end portion of the main housing 12 that is opposite to the communicating member 11. The gas rectifier 13 is configured as a plate and has a plurality of air holes 130 in fluid communication with the gas guiding space 10. In this embodiment, the communicating member 11 and the main housing 12 are both made of stainless steel to enhance a structural strength of the connecting unit 1 to thereby withstand gas pressure of the exhaust gas.

The flow guiding unit 2 is disposed in the gas guiding space 10, and includes a guiding member 21, a main body 22, and a flow disturbing member 23. The guiding member 21 surrounds the axis (Y), defines a flow channel 210 that is in fluid communication with the gas channel 110, and has a plurality of through holes 211 that are in fluid communication with the flow channel 210. The main body 22 diverges gradually from the guiding member 21, is opposite to the communicating member 11, defines a flow guiding space 20 therein that is frustoconical, that surrounds the axis (Y), and that is adapted for passage of the exhaust gas therethrough. The main body 22 cooperates with the main housing 12 to define an annular flow channel (D) therebetween that is in fluid communication with the through holes 211 and that is adapted for passage of a portion of the exhaust gas therethrough. The main body 22 has a plurality of openings 221 in fluid communication with the flow guiding space 20 and the annular flow channel (D). That is to say, the flow channel 210 is in fluid communication with the annular flow channel (D) via the through holes 211, and the flow guiding space 20 is in fluid communication with the annular flow channel (D) via the openings 221. Further referring to FIG. 6, the flow disturbing member 23 is disposed at a terminal portion of the main body 22 that is opposite to the communicating member 11, has a plurality of flow distributing holes 231 that are adapted for passage of the exhaust gas therethrough, and is adapted for disturbing a direction of the exhaust gas to evenly distribute the exhaust gas flowing therethrough.

In this embodiment, the guiding member 21 and the main body 22 are also made of stainless steel, but are not limited thereto, and are integrally formed, so a structural strength of the guiding member 21 and the main body 22 is sufficient for withstanding the gas pressure of the exhaust gas. In this embodiment, the communicating member 11, the main housing 12, the guiding member 21, and the main body 22 are co-axially arranged along the axis (Y).

Figure 6:
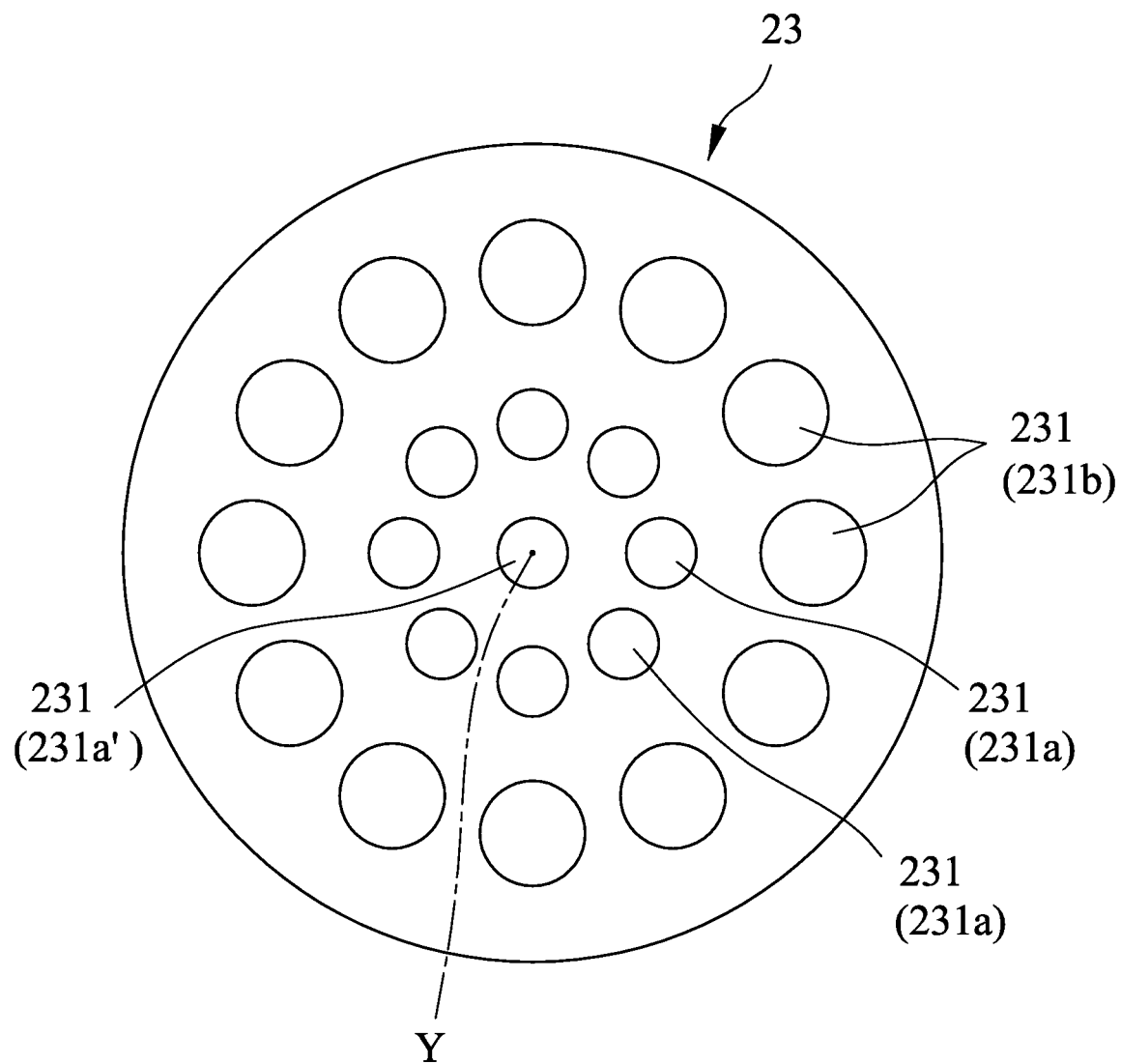
FIG. 6 is a top view illustrating a flow disturbing member of the embodiment.

As shown in FIG. 6, the flow disturbing member 23 further has a center hole 231a' disposed at the axis (Y), and the flow distributing holes 231 of the flow disturbing member 23 are arranged along a plurality of concentric circles centered at the axis (Y) and surround the center hole 231a'. A size of the center hole 231a' is not greater than that of each of the flow distributing holes 231. Generally, a size of each of the flow distributing holes 231 that are arranged along one of the concentric circles disposed away from the axis (Y) is greater than a size of each of the flow distributing holes 231 that are arrange along another one of the concentric circles disposed adjacent to the axis (Y). Specifically, a size of each of the flow distributing holes 231 increases radially and outwardly with respect to the axis (Y). In this embodiment, the flow distributing holes 231 includes a plurality of first distributing holes 231a arranged along a first one of the concentric circles disposed adjacent to the axis (Y) and equiangularly spaced apart from each other, and a plurality of second distributing holes 231b arranged along a second one of the concentric circles disposed away from the axis (Y), surrounding the first distributing holes 231a, and equiangularly spaced apart from each other.

Referring back to FIG. 5, the air holes 130 of the gas rectifier 13 are adapted for dispersing the exhaust gas passing therethrough to enter the scrubbing module 82. In this embodiment, each of the air holes 130 is a through hole, extends in a direction parallel to the axis (Y), and has a regular hexagon cross section. The air holes 130 provide a plurality of flow channels between the gas guiding space 10 and the stabilizing unit 3 for evenly dispersing the exhaust gas passing therethrough.

The stabilizing unit 3 includes a chamber body 31 defining a retention space 30 adapted for maintaining evenness of the exhaust gas that has been disturbed by the flow disturbing member 23 and dispersed by the air holes 130 of the gas rectifier 13. Specifically, the chamber body 31 includes a surrounding wall 311 surrounding an outer periphery of the gas rectifier 13, extending away from the main housing 12 of the connecting unit 1 in a direction parallel to the axis (Y), and defining the retention space 30. In this embodiment, the surrounding wall 311, the communicating member 11, and the guiding member 21 are coaxially disposed with respect to the axis (Y), and the surrounding wall 311 is also made of stainless steel for withstanding the gas pressure of the exhaust gas.

Figure 7:
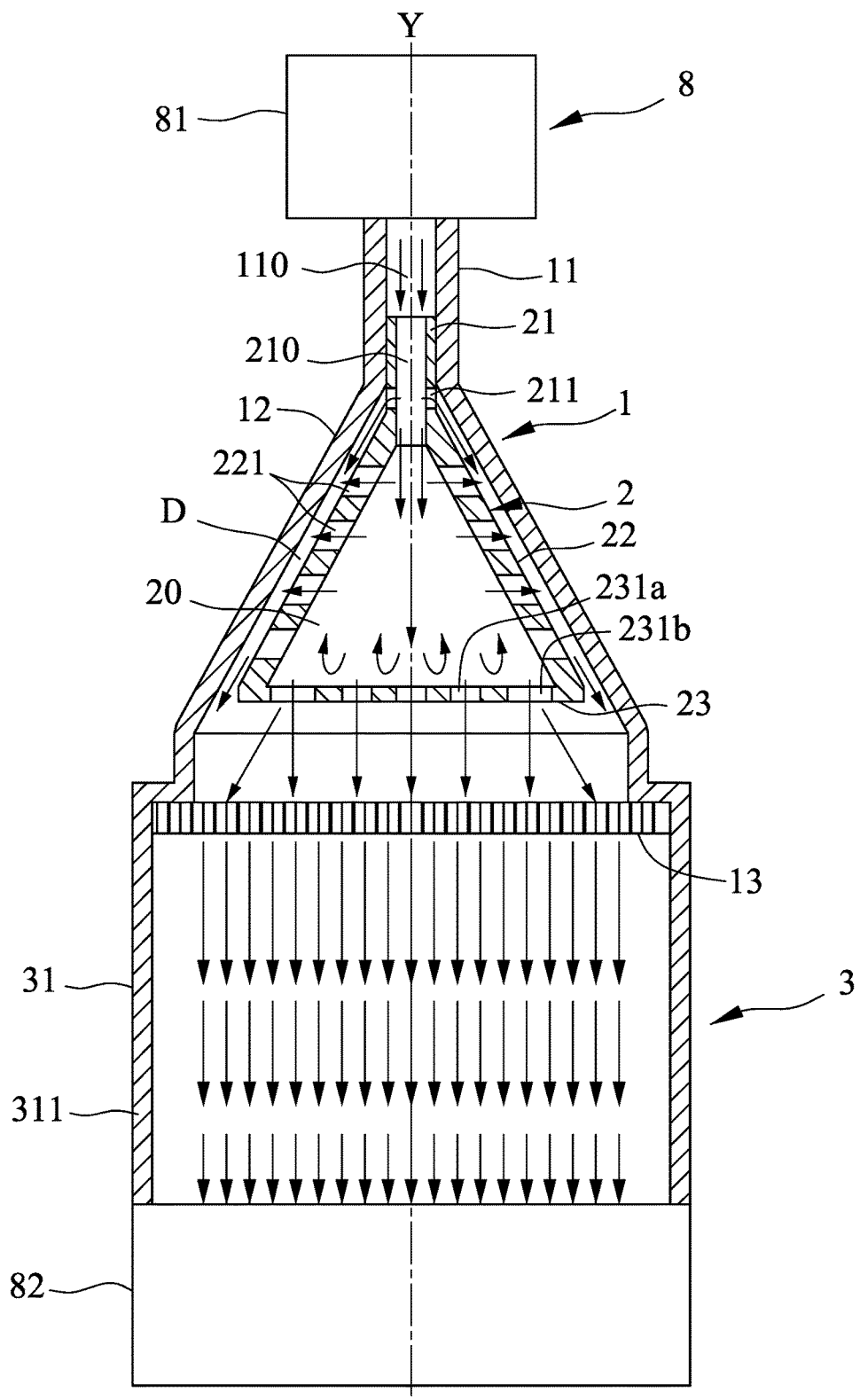
FIG. 7 is schematic sectional view similar to FIG. 3, but illustrating flow directions of an exhaust gas flowing in the flow guiding device of the embodiment.

As shown in FIG. 7, during operation of the carbon capture system 8 equipped with the flow guiding device of the present embodiment, the delivery module 81 outputs the exhaust gas to be introduced into the gas channel 110 of the communicating member 11. After the exhaust gas flows into the flow channel 210 of the guiding member 21 from the gas channel 110, a majority portion of the exhaust gas flows into the flow guiding space 20 as a concentrated stream in a direction parallel to the axis (Y) and then flows through the flow disturbing member 23, and a small portion of the exhaust gas flows into the annular flow channel (D) via the through holes 211. At this time, some of the exhaust gas in the flow guiding space 20 flows into the annular flow channel (D) via the openings 221.

It should be noted that when the exhaust gas flows from the gas channel 110 into the flow channel 210 that has a cross section transverse to the axis (Y) and being smaller than a cross section of the gas channel 110, a flow rate and a pressure of the exhaust gas is increased. Then, the exhaust gas may generate an irregular flow vortex when entering the flow guiding space 20 that has a cross section transverse to the axis (Y) and being greater than the cross section of the flow channel 210. At this time, the exhaust gas flows along an inner surface of the guiding member 21, and thus some of the exhaust gas flows through the openings 221 into the annular flow channel (D), thereby evenly distributing the exhaust gas.

As shown in FIGS. 3 and 7, by virtue of the structure of the size of each of the first distributing holes 231a being smaller than that of each of the second distributing holes 231b, a fluid resistance at a portion of the flow disturbing member 23 that is formed with the first distributing holes 231a is greater than a fluid resistance of another portion of the flow disturbing member 23 that is formed with the second distributing holes 231b, a direction of the exhaust gas flowing from the flow guiding space 20 into the gas guiding space 10 is disturbed by the flow disturbing member 23 so that the concentrated stream of the exhaust gas is dispersed evenly. For example, an amount of the exhaust gas flowing through each of the first distributing holes 231a is substantially the same as that flowing through each of the second distributing holes 231b. As a result, the exhaust gas flowing out of the flow guiding space 20 and the annular flow channel (D) are distributed evenly into the gas guiding space 10.

Subsequently, the exhaust gas that is distributed evenly by the flow guiding unit 2 in the gas guiding space 10 flows through the air holes 130 of the gas rectifier 13 that are arranged to be parallel to each other, so as to be further dispersed into a plurality of flows for slowly flowing into the stabilizing unit 3 and then into the scrubbing module 82. It should be noted that a hexagonal cross section of each of the air holes 130 (see FIGS. 4 and 5) provides a relatively stable structural strength for the gas rectifier 13, and a relatively large flow rate of the exhaust gas flowing through the air holes 130 may be achieved.

Hereafter, when the plurality of flows of the exhaust gas that flows through the gas rectifier 13 enter the stabilizing unit 3, the retention space 30 of the chamber body 31 provides a sufficient space for the plurality of flows of the exhaust gas to flow smoothly and stably into the scrubbing module 82. In this way, the exhaust gas may contact the scrubber of the scrubbing module 82 for a sufficient period of reaction time to effectively absorb chemical components, e.g., carbon monoxide, carbon dioxide, etc., in the exhaust gas As compared to a flow guiding tube 92 described in the background section, the flow guiding device of the present disclosure is capable of dispersing the exhaust gas evenly to thereby increase the contact area and the reaction time of the exhaust gas with the scrubber of the scrubbing module 82 for sufficiently absorbing chemical components in the exhaust gas.

In summary, by virtue of the structural design of the main housing 12 and the main body 22 that respectively define frustoconical spaces therein, and by virtue of the size of each of the first distributing holes 231a and the second distributing holes 231b of the flow disturbing member 23, the exhaust gas output from the delivery module 81 is dispersed evenly with respect to the axis (Y). Furthermore, the air holes 130 of the gas rectifier 13 evenly distribute the exhaust gas to slowly flow into the retention space 30, thereby reducing a flow rate of the exhaust gas, so the reaction time of the exhaust gas with the scrubber is increased, thereby improving efficiency of removing chemical components in the exhaust gas.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A flow guiding device for a carbon capture system, the carbon capture system including a delivery module for outputting an exhaust gas that contains carbon, and a scrubbing module disposed downstream of and in fluid communication with the delivery module and including a scrubber that is for scrubbing carbon dioxide in the exhaust gas, said flow guiding device comprising:

a connecting unit that is adapted to be connected to the delivery module and that includes
    a communicating member adapted to be connected to the delivery module and defining a gas channel that extends along an axis and that is adapted to convey the exhaust gas,
    a main housing diverging gradually from said communicating member, defining a gas guiding space that is frustoconical and that surrounds the axis, and adapted to be opposite to the delivery module along the axis, and a gas rectifier disposed at an end portion of said main housing that is opposite to said communicating member, and having a plurality of air holes adapted for dispersing the exhaust gas passing therethrough to enter said scrubbing module; and a flow guiding unit that is disposed in and connected to said connecting unit, and that includes a guiding member surrounding the axis, defining an flow channel that is in fluid communication with said gas channel, and having a plurality of through holes that are in fluid communication with said flow channel, a main body diverging gradually from said guiding member, opposite to said communicating member, defining a flow guiding space therein that is frustoconical, that surrounds the axis, and that is adapted for passage of the exhaust gas therethrough, and cooperating with said main housing to define an annular flow channel therebetween that is in fluid communication with said through holes and that is adapted for passage of a portion of the exhaust gas therethrough, and a flow disturbing member disposed at a terminal portion of said main body that is opposite to said communicating member, and having a plurality of flow distributing holes that are adapted for passage of the exhaust gas therethrough.

2. The flow guiding device as claimed in claim 1, wherein said flow guiding device further comprises a stabilizing unit in fluid communication with said connecting unit and the scrubbing module, and including a chamber body that defines a retention space adapted for maintaining evenness of the exhaust gas that has been dispersed by said air holes of said gas rectifier.

3. The flow guiding device as claimed in claim 1, wherein said main body of said flow guiding unit has a plurality of openings in fluid communication with said flow guiding space and said annular flow channel.

4. The flow guiding device as claimed in claim 1, wherein said flow distributing holes are arranged along a plurality of concentric circles centered at the axis.

5. The flow guiding device as claimed in claim 4, wherein a size of each of said flow distributing holes increases radially and outwardly with respect to the axis.

6. The flow guiding device as claimed in claim 4, wherein a size of each of said flow distributing holes that are arranged along one of the concentric circles disposed away from the axis is greater than a size of each of said flow distributing holes that are arrange along another one of the concentric circles disposed adjacent to the axis.

7. The flow guiding device as claimed in claim 6, wherein said flow distributing holes includes a plurality of first distributing holes arranged along a first one of the concentric circles disposed adjacent to the axis, and equiangularly spaced apart from each other, and a plurality of second distributing holes arranged along a second one of the concentric circles disposed away from the axis, and equiangularly spaced apart from each other.

8. The flow guiding device as claimed in claim 4, wherein said flow disturbing member further has a center hole disposed at the axis.

9. The flow guiding device as claimed in claim 8, wherein a size of each of said flow distributing holes increases radially and outwardly with respect to the axis.

10. The flow guiding device as claimed in claim 8, wherein:

a size of said center hole is not greater than that of each of said flow distributing holes; and a size of each of said flow distributing holes that are arranged along one of the concentric circles disposed away from the axis is greater than a size of each of said flow distributing holes that are arranged along another one of the concentric circles disposed adjacent to the axis.

11. The flow guiding device as claimed in claim 10, wherein said flow distributing holes includes a plurality of first distributing holes arranged along a first one of the concentric circles disposed adjacent to the axis, and equiangularly spaced apart from each other, and a plurality of second distributing holes arranged along a second one of the concentric circles disposed away from the axis, and equiangularly spaced apart from each other.

12. The flow guiding device as claimed in claim 1, wherein each of said air holes is a through hole and extends in a direction parallel to the axis.

13. The flow guiding device as claimed in claim 12, wherein each of said air holes has a regular hexagonal cross section.

* * * * *